March 3, 1931.   R. F. DEHN   1,795,082
FRICTION CLUTCH
Original Filed Dec. 10, 1926
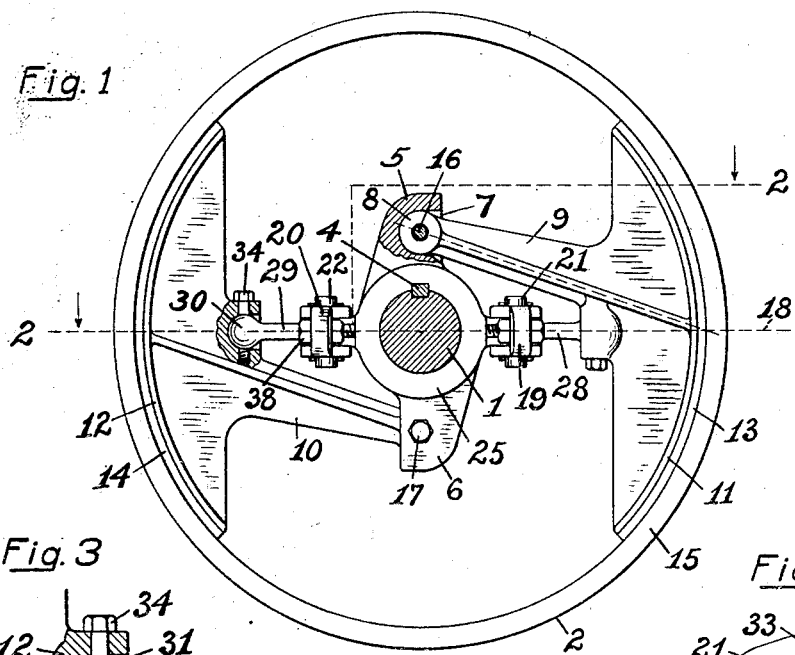
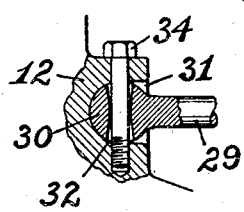
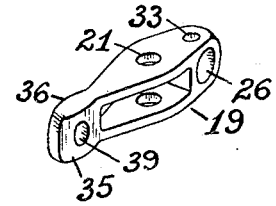
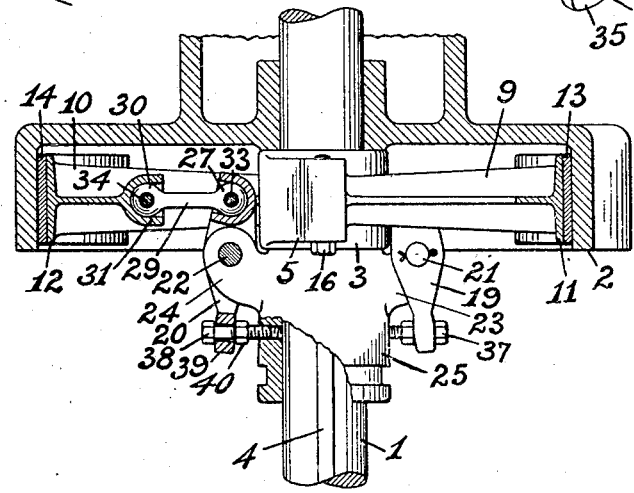
Inventor
Roy F. Dehn
By *G. E. Dunstan*,
his Attorney Patented Mar. 3, 1931

1,795,082

UNITED STATES PATENT OFFICE

ROY F. DEHN, OF CLEVELAND, OHIO

FRICTION CLUTCH

Application filed December 10, 1926, Serial No. 153,840. Renewed July 30, 1930.

This invention relates to friction clutches, and has for its principal object to provide a friction clutch of such construction that the shoes thereof will exert throughout their entire contact surfaces evenly distributed pressure thereby attaining the maximum friction or efficiency and the even wearing away of the entire surfaces of the shoes.

Another object of the invention is to provide a friction clutch of said character, in which the wearing away of the friction surfaces does not affect the angle of application of the driving power relative to said friction surfaces.

Another object of the invention is to provide a friction clutch of said character, in which the adjustment for wear is conveniently and easily made.

Another object of the invention is to provide a friction clutch of said character, which is operated manually and requires very little effort on the part of the operator.

With the above and other objects in view, the invention will be hereinafter fully described as illustrated in the accompanying drawings, and the novel features thereof will be distinctly pointed out in the appended claims.

In the drawings similar characters of reference indicate corresponding parts.

Figure 1 is an elevation or end view of a friction clutch constructed in accordance with my invention, certain parts being broken away to better show the construction thereof, Fig. 2 is a plan sectional view taken on line 2—2 of Fig. 1, Fig. 3 is a sectional view illustrating the ball and socket connections of the links with the shoes, and Fig. 4 is a perspective view of one of the levers.

Referring to the drawings, 1 represents the power or driving shaft and 2 the driven drum which is loosely mounted upon said shaft and is adapted to transmit power. For transmitting the power from the driving shaft 1 to the driven drum 2, a hub 3 is fixed to said shaft by means of a key 4, and this hub has formed integrally therewith oppositely extending lateral arms 5 and 6. Each arm is provided with a recess, indicated at 7, for receiving the rounding ends as at 8 of a pair of lever-arms 9 and 10 formed integrally with shoes 11 and 12, which carry on their faces suitable frictional pieces 13 and 14 adapted to engage the inner side of the annular rim 15 of the driven drum 2. The ends 8 of the lever-arms are pivotally connected to the arms 5 and 6 in diametrical alignment at 16 and 17 respectively, to permit swinging movement of said arms so as to bring the shoes 11 and 12 into or out of engagement with the rim 15. An important feature of this invention is that the lever-arms 9 and 10 normally are on an angle extending from said pivotal points 16 and 17 to the transverse center lines of the frictional pieces 13 and 14 of the shoes 11 and 12 and the driven drum 2, and said transverse center lines are in alignment with a line at right angles to said diametrical line passing through the pivotal points 16 and 17 and indicated by 18.

For forcing the shoes 11 and 12 into engagement with the rim 15 of the drum 2, levers 19 and 20 are pivoted at 21 and 22 respectively to oppositely disposed lateral lugs 23 and 24 formed integrally with a collar 25, which is mounted upon the driving shaft 1. This collar is adapted to turn with said driving shaft but slide longitudinally thereupon, and this is accomplished by utilizing the before mentioned key 4. The inner ends of the levers 19 and 20 are provided with sockets as 26 for receiving the ball ends, indicated by 27, of links 28 and 29, the other ball ends of which, indicated by 30, rest in sockets, indicated by 31, of the shoes 11 and 12. The ball ends 27 and 30 are provided with outwardly flared openings, as indicated at 32, for receiving bolts or pins 33 and 34 for pivotally connecting said ends to the levers and shoes and yet permit sufficient free movement at these points for the proper functioning of the parts. The outer or free ends of the levers 19 and 20 have oppositely curved surfaces at 35 and 36, and said ends are adjustably connected to the collar 25 by means of stud bolts 37 and 38, which pass through openings of said levers, indicated at 39. Nuts 40 are provided upon said stud bolts for serving as flanges or shoulders for engaging said curved surfaces of the ends of the levers. For actuating the shoes 11 and 12, the collar 25 is slidably moved upon the driving shaft 1 by manual manipulation of any suitable mechanism. The convenient location of the adjusting bolts 37 and 38 make them easily accessible for turning them in or out for proper adjustment of the levers 19 and 20 to take up the wear on the shoes.

It is readily seen that in a frictional clutch constructed as described, the frictional surfaces of the shoes 11 and 12 are forced evenly against the inner side of the rim 15 of the drum due to said shoes being an equal length at each side of the transverse diameter of the drum indicated by 18, and said shoes being pivotally supported at 16 and 17 by the lever-arms 9 and 10, which normally extend in the direction of lines from said pivotal points to the intersection of the transverse diameter of the drum, and the application of the actuating power on said transverse diameter against the centers of said shoes through the links 28 and 29 by the sliding movement of the collar 25 and the levers 19 and 20 carried thereby. This even contact of the shoes with the rim because the shoes are pivotally supported at 16 and 17 and therefore actuated substantially in a straight line by the links 28 and 29, gives the maximum friction efficiency of the shoes, even wearing thereof, and but little effort is required on the part of the operator for actuating the clutch.

It will be understood that slight changes in the details of construction may be made within the scope of the claims, and also that by holding the drum 2 against rotation, the shoes 11 and 12 would serve as brakes for locking the shaft 1 against rotation.

Having fully described my invention, what I claim is:

1. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers carried by said collar for actuating the links upon longitudinal movement of the collar, and means for adjusting said levers.

2. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, and means for adjusting the other ends of said levers relative to the collar whereby the longitudinal movement of the collar will actuate said shoes a distance proportionally to the adjustment of the levers.

3. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, the other ends of the levers being provided with openings, stud bolts fixed in said collar and passing through said openings, and nuts upon said stud bolts adapted to engage the ends of said levers.

4. In a friction clutch, the combination of a shaft, a drum loosely mounted on the shaft, a hub, the hub being fixed to said shaft, a collar, the hub having oppositely extending arms, the collar being feather keyed to the shaft, shoes adapted to engage the drum, the transverse centers of the shoes being in a plane at right angles to the said arms of the hub, lever-arms formed integrally with said shoes and extending from the transverse centers thereof and having their ends pivotally supported by said arms of the hub, and means for actuating the shoes from the longitudinal movement of said collar.

5. In a friction clutch, the combination of a shaft, a drum loosely mounted on the shaft, a hub, the hub being fixed to said shaft, a collar, the hub having oppositely extending arms, the collar being feather keyed to the shaft, shoes adapted to engage the drum, the transverse centers of the shoes being in a plane at right angles to the said arms of the hub, lever-arms formed integrally with said shoes and extending from the transverse centers thereof and having their ends pivotally supported by said arms of the hub, links engaging said shoes, and means carried by said collar for actuating the links upon longitudinal movement of the collar.

In testimony whereof, I affix my signature.

ROY F. DEHN.